March 25, 1930.   H. NYQUIST   1,751,527

DISTORTIONLESS AMPLIFYING SYSTEM

Filed Nov. 24, 1926

INVENTOR.
H. Nyquist
BY
ATTORNEY

Patented Mar. 25, 1930

1,751,527

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

DISTORTIONLESS AMPLIFYING SYSTEM

Application filed November 24, 1926. Serial No. 150,525.

This invention relates to distortionless amplifying systems, and more particularly to arrangements of a plurality of vacuum tubes interconnecting an incoming circuit and an outgoing circuit so that the circuits associated with said vacuum tubes may be supplied with the necessary potentials from a source of current.

It has been the practice to connect a plurality of vacuum tubes in tandem with respect to each other for amplifying signals. A plurality of batteries, usually known as "A", "B" and "C" batteries, were connected to the circuits of the vacuum tubes for supplying the necessary potentials thereto, the "A" battery, or batteries, bringing the cathodes of the vacuum tubes to suitable electron emitting temperatures, the "B" battery, or batteries, bringing the plates of the vacuum tubes to suitable potentials with respect to the cathodes, and the "C" battery, or batteries, providing the necessary bias for grids of said tubes.

It is an object of this invention to provide a system for eliminating the use of "A", "B" and "C" batteries, which shall equally well establish the necessary operating characteristics for a plurality of vacuum tubes, and furthermore, to provide the necessary operating potentials for the vacuum tubes of a distortionless interstage coupling arrangement from a source of alternating current which has been rectified, or, if preferred from a direct current source, such as a battery, generator, etc.

It is another object of this invention to so relate a plurality of resistances to a source of electromotive force that the potential drops across these resistances will be of the proper magnitudes to provide suitable potentials for the associated circuits.

Figure 1:
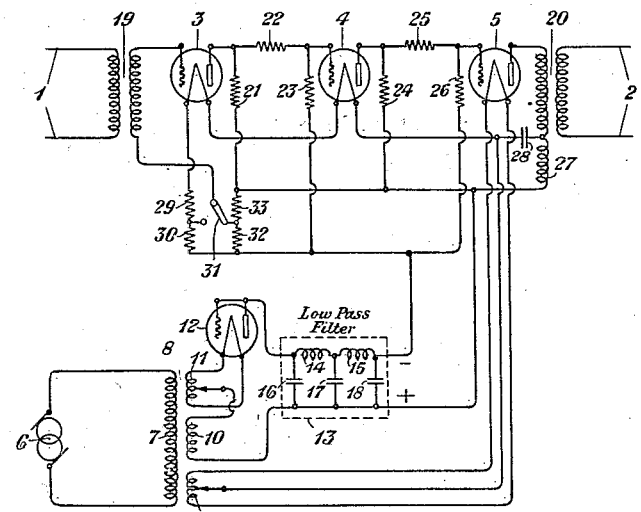
Figure 2:
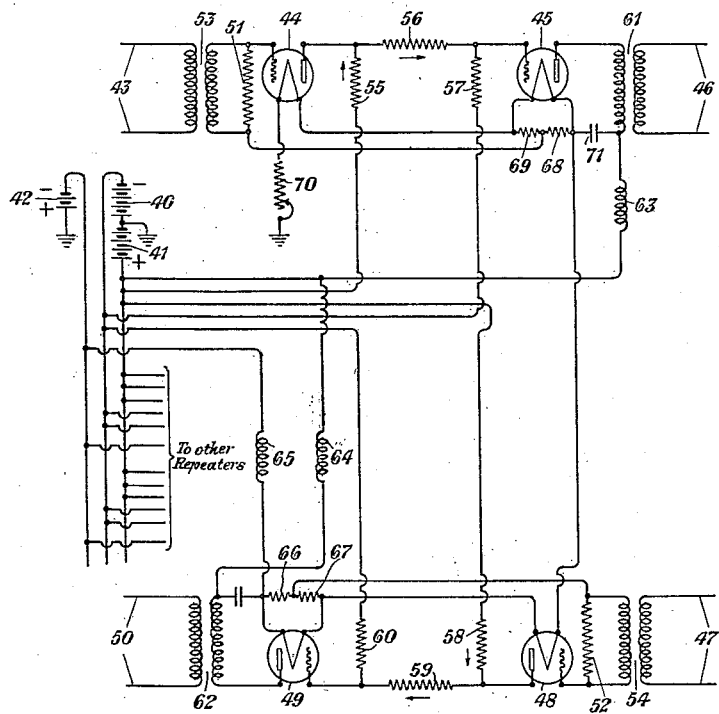

While the nature of the invention will be pointed out with particularity in the appended claims, the invention itself, both as to its further objects and features, will be better understood from the following description, when read in connection with the accompanying drawing, in which Figure 1 represents a distortionless amplifying system, the operating potentials of which are derived from a rectified alternating current source and in which Fig. 2 represents a two-way repeater embodying some of the principles of this invention.

Referring to Fig. 1 of the drawing, there is shown a distortionless amplifying system having an incoming circuit connected to the terminals 1, and an outgoing circuit connected to the terminals 2. Signals impressed upon the incoming terminals 1 will be amplified by the system and, after amplification, will be transmitted to the outgoing circuit 2. The amplifying system comprises a plurality of vacuum tubes arranged in tandem with respect to one another. These vacuum tubes are designated by the reference characters 3, 4, and 5, and they are resistance coupled for distortionless amplification.

A source of alternating current, such as a 110-volt, 60-cycle house lighting circuit, is designated by the reference character 6, and this source of alternating current is connected to the primary winding 7 of a transformer 8. The secondary of the transformer 8 comprises three windings 9, 10, and 11, windings 9 and 11 being low voltage windings, and winding 10 being preferably a high voltage winding. The reference character 12 represents a rectifier of the electron type, having an anode and a cathode, this rectifier rectifying the current which is to be transmitted through the amplifying system to provide suitable operating potentials therefor. It will be understood, however, that any other means of rectification well known in the art may equally well be employed instead of this rectifier of the electron type, without narrowing the scope of the invention.

A filter 13, preferably a low pass filter, is connected between the anode of the rectifier 12 and one terminal of the secondary winding 10 of the transformer 8, this filter comprising a pair of series inductances 14 and 15 and a number of shunt capacities 16, 17 and 18.

The winding 9 of the transformer 8 is connected to the cathode of the vacuum tube 5, and the winding 11 of the transformer 8 is connected to the cathode of the rectifier 12, these cathodes being thereby heated to suitable electron-emitting temperatures. It will be understood, however, that although only one of the cathodes of the amplifying system is being supplied with energy from an alternating current source, the other of the cathodes of the amplifying system may equally well be supplied with alternating current energy within the scope of the invention. Yet it must be remembered that by confining the use of alternating current to a cathode, or cathodes, of the last stage, or stages, of amplification of an amplifying system, the noise produced in the amplifier output, due to the use of alternating current to heat the cathodes, is practically negligible.

Signals impressed upon the incoming terminals 1 are transmitted to the input circuit of the vacuum tube 3 through a transformer 19. After amplification by the system, the signals are transmitted in amplified form from the output circuit of the vacuum tube 5 to the outgoing circuit 2 through a transformer 20. Interconnecting any pair of these vacuum tubes are a plurality of resistances, all of which are preferably adjustable. Three resistances, 21, 22, and 23, are arranged between the vacuum tubes 3 and 4, and three other resistances, 24, 25, and 26, are arranged between the vacuum tubes 4 and 5. The resistance 22 connects the anode of the vacuum tube 3 to the grid of the vacuum tube 4, and the resistance 25 connects the anode of the vacuum tube 4 to the grid of the vacuum tube 5. Current from the source 6, after rectification and after filtration, flows through the resistances 21 and 24, respectively, and then through the space discharge paths of the vacuum tubes 3 and 4, respectively. Some of the current that flows through resistances 21 and 24 also flows through the resistances 22 and 23 and resistances 25 and 26, respectively, and then reaches the negative terminal of the filter 13. These resistances are so proportioned that the proper potentials are applied to the anodes of the vacuum tubes 3 and 4 and to the grids of the vacuum tubes 4 and 5. Positive potential is also applied to the anode of the vacuum tube 5 through a choke coil 27 and the primary winding of the transformer 20. A condenser 28 is connected in a circuit which includes the primary winding of the transformer 20 and the anode and cathode of the vacuum tube 5, and this condenser has substantially negligible reactance at the signaling frequencies.

The cathodes of the vacuum tubes 3 and 4 are in series relationship with each other and the current that flows therethrough is, in the illustrated figure of the drawing, the same as that which flows between the anode and cathode of the vacuum tube 5. This filament circuit is a direct current circuit and comprises the winding 10 of the transformer 8, the choke coil 27, the primary winding of the transformer 20, the anode and the cathode of the vacuum tube 5, the winding 9 of the transformer 8, the cathode of the vacuum tube 4, the cathode of the vacuum tube 3, resistances 29 and 30, the inductances 15 and 14 of the low pass filter 13, the anode and cathode of the rectifier 12, and the winding 11 of the transformer 8.

The grid potential for the vacuum tube 3 may be derived by connecting a switch 31 to the point interconnecting resistances 29 and 30. Signaling currents in the output circuits of the vacuum tubes 3 and 4 obviously flow over the resistances 29 and 30. If the feed back voltage across resistance 29 exceeds a desirable value, the amplifier will sing. Additional resistances 32 and 33 may be connected in parallel with the low pass filter 13. By throwing switch 31 to the right-hand terminal, the grid potential for the vacuum tube 3 will then be derived from the voltage drop across resistances 32 and 33, over which no signaling currents flow. This is so because the impedance looking into the filter 13 is negligibly small at the signaling frequencies, which impedance may be obtained by making the condenser 18 of the filter 13 of high capacity. The feed-back voltage will thus be substantially eliminated from the grid of tube 3.

The filter 13, connected to the rectifier 12, renders the circuit connected to this rectifier as free from alternating current components as possible. The cut-off frequency of the filter 13 is lower than the frequency of the alternating current source 6, and may be, for example, 30 cycles. Since no frequency present in the 60-cycle source, or produced therefrom by the action of the rectifier 12, is below the cut-off frequency of the filter, all of the circuits connected to the rectifier 12 will be substantially free from alternating current components.

In Fig. 2 of the drawing a two-way repeater is shown, and the voltages for the vacuum tubes of this repeater are derived from batteries 40, 41 and 42. In the arrangement of this figure of the drawing, the alternating currents originating in the incoming circuit 43 are amplified by the vacuum tubes 44 and 45, and are then transmitted to the outgoing circuit 46. Currents originating in the incoming circuit 47 are amplified by the vacuum tubes 48 and 49 and are then transmitted to the outgoing circuit 50. Resistances 51 and 52 bridge the secondary windings of the transformers 53 and 54, respectively, and these resistances are commonly used in amplifiers of this sort.

A plurality of resistances are inserted between the vacuum tubes 44 and 45 and between the vacuum tubes 48 and 49, respectively. These resistances, 55, 56 and 57, and 58, 59, and 60, are, respectively, in series with the batteries 40 and 41. Resistance 56 connects the anode of the vacuum tube 44 with the grid of the vacuum tube 45, and resistance 59 connects the anode of the vacuum tube 48 with the grid of the vacuum tube 49. These resistances are so proportioned, or, if preferred, are so adjusted, that the proper potentials are provided for the anodes of the vacuum tubes 44 and 48 and for the grids of the vacuum tubes 45 and 49, respectively. The repeater filament circuit includes the battery 42, the winding 65, resistances 66 and 67 and the filament of tube 49 in shunt therewith, the filament of tube 48, resistances 68 and 69 and the filament of tube 45 in shunt therewith, the filament of tube 44, resistance 70, and ground. It will be understood that, while in Fig. 2 of the drawing the filaments are connected in a series circuit, merely for illustrative purposes, these filaments may, nevertheless, be connected in a parallel circuit, within the scope of this invention.

It will be understood that it is one of the primary objects of this invention to employ resistance in coupling various stages of vacuum tube amplifiers so that the necessary voltages for all of the elements of these vacuum tubes may be derived from a common source. The use of resistances in the manner shown in this invention eliminates the necessity for grid condensers, and avoids the subsequent blocking of the amplifiers due to the overloading of the tubes. Another and important advantage gained by the employment of resistance coupling is the equal transmission of all frequencies, thereby rendering the amplifiers suitable for high quality, distortionless service.

While this invention has been described in certain particular embodiments merely for the purpose of illustration, it is to be clearly understood that the principles of this invention may be applied to other and widely varied organizations without departing from the spirit of the invention and the scope of the appended claims.

What is claimed is:

1. A distortionless coupling arrangement for an amplifying system comprising two three-element vacuum tubes, a resistance connecting the plate of the first vacuum tube to the grid of the second vacuum tube, a source of alternating current, means for rectifying said alternating current, a filter connected to said rectifying means, said filter having a cutoff frequency lower than the frequency of said alternating current, and two other resistances, said latter resistances connecting opposite terminals of the first resistance to opposite terminals of said filter, respectively.

2. A distortionless coupling arrangement for an amplifying system of a plurality of three-element vacuum tubes, comprising a source of rectified current, and a plurality of resistances of invariable and predetermined magnitudes, one of said resistances connecting the plate of one vacuum tube to the grid of the next succeeding vacuum tube, two of said resistances extending from the terminals of the first resistance to the opposite terminals, respectively, of said source of direct current.

In testimony whereof, I have signed my name to this specification this 23rd day of November, 1926.

HARRY NYQUIST.